United States Patent
Ziemann

(10) Patent No.: US 11,400,543 B2
(45) Date of Patent: Aug. 2, 2022

(54) DEVICE FOR PROTECTING LASER OPTICS

(71) Applicant: HIGHYAG Lasertechnologie GmbH, Kleinmachnow (DE)

(72) Inventor: Andreas Ziemann, Potsdam (DE)

(73) Assignee: HIGHYAG LASERTECHNOLOGIE GMBH, Kleinmachnow (DE)

(*) Notice: Subject to any disclaimer, the term of this patent is extended or adjusted under 35 U.S.C. 154(b) by 691 days.

(21) Appl. No.: 16/215,919

(22) Filed: Dec. 11, 2018

(65) Prior Publication Data

US 2019/0176263 A1 Jun. 13, 2019

(30) Foreign Application Priority Data

Dec. 11, 2017 (LU) .................................. 100538

(51) Int. Cl.
*B23K 26/03* (2006.01)
*B23K 26/70* (2014.01)
(Continued)

(52) U.S. Cl.
CPC .......... *B23K 26/032* (2013.01); *B23K 26/142* (2015.10); *B23K 26/1436* (2015.10); *B23K 26/1464* (2013.01); *B23K 26/706* (2015.10)

(58) Field of Classification Search
CPC ............... B23K 26/03; B23K 26/0643; B23K 26/0648; B23K 26/0652; B23K 26/032; B23K 26/064; B23K 26/12; B23K 26/123; B23K 26/125; B23K 26/127; B23K 26/14; B23K 26/142; B23K 26/1436; B23K 26/1462; B23K 26/1464; B23K 26/147; B23K 26/1476; B23K 26/1488; B23K 26/1494; B23K 26/70; B23K 26/702; B23K 26/706; B23K 26/703; B23K 26/38; B23K 26/16; B23K 26/342; B23K 26/0006; B23K 26/046; B23K 37/0408; B23K 26/0884; B23K 37/0235; B23K 26/0093; B23K 26/10; B23K 26/21; B23K 37/006; B23K 26/0876; B23K 26/04; B23K 26/042; B23K 26/043; B23K 26/707; B23K 26/034;
(Continued)

(56) References Cited

U.S. PATENT DOCUMENTS 5,239,552 A 8/1993 Okuyama
9,031,110 B2 * 5/2015 Murray ................. G02B 7/007
372/38.09
(Continued)

FOREIGN PATENT DOCUMENTS

DE 43 29 322 A1 3/1994
DE 100 47 057 A1 4/2002
(Continued)

Primary Examiner — Joel M Attey
Assistant Examiner — Rachel R Rizzo
(74) Attorney, Agent, or Firm — Blank Rome LLP

(57) ABSTRACT

A device for the protection of laser optics or to their lifetime increase. The device for the protection of laser optics comprises a housing arranged below a laser optics housing with a connection for the supply of a cutting gas, and on the opposite side to the laser optics outlet nozzle for the cutting gas and a pressure-resistant protective glass on the side of the laser optics and a process-side protective glass, which is arranged between the nozzle and pressure-resistant protective glass available.

19 Claims, 2 Drawing Sheets

(51) Int. Cl.
*B23K 26/142* (2014.01)
*B23K 26/14* (2014.01)

(58) Field of Classification Search
CPC ............... B23K 26/082; B23K 26/382; B23K 26/0861; B23K 26/40; B23K 26/389; B23K 26/0096; B23K 26/08; B22F 12/00; B22F 10/20; G02B 7/1815; G02B 7/08; G02B 27/141; G02B 7/14; G02B 27/0006; G02B 7/16; G02B 7/028; G02B 1/11; G02B 7/007; G02B 6/32; G02B 7/025; G02B 7/023; G02B 6/3813; G02B 6/3814; B33Y 30/00; B33Y 40/00; G01N 21/8422; G01N 21/15; B23B 27/00; F16P 3/144; F16P 1/06; H01J 37/3005; H01J 37/226; B41C 1/05; C21D 1/82; B08B 15/04; G01M 11/0242; G01M 11/0278
See application file for complete search history.

(56) References Cited

U.S. PATENT DOCUMENTS

| | | | |
|---|---|---|---|
| 2016/0248215 A1* | 8/2016 | Suzuki | B01D 53/685 |
| 2016/0368091 A1* | 12/2016 | Kung | B23K 26/064 |
| 2017/0050267 A1 | 2/2017 | Kung | |
| 2017/0326669 A1* | 11/2017 | Bautze | B23K 26/21 |

FOREIGN PATENT DOCUMENTS

| | | | |
|---|---|---|---|
| DE | 100 60 176 A1 | | 6/2002 |
| DE | 101 23 097 A1 | | 12/2002 |
| DE | 102 26 359 A1 | | 12/2003 |
| DE | 10 2005 025 119 A | | 12/2005 |
| DE | 10 2014 210838 A1 | | 12/2015 |
| JP | 2001 259872 A | | 9/2001 |
| JP | 2004 306106 A | | 11/2004 |
| JP | 2009 226474 A | | 10/2009 |
| JP | 2009226474 A | * | 10/2009 |
| WO | 95/03911 | | 2/1995 |

* cited by examiner

DEVICE FOR PROTECTING LASER OPTICS

CROSS-REFERENCE TO RELATED APPLICATIONS

The present application claims priority to Luxembourg Patent Application No. LU 100538 filed on Dec. 11, 2017. The aforementioned application is hereby incorporated by reference in its entirety.

BACKGROUND OF THE INVENTION

Field of the Invention

The invention relates to a device for the protection of laser optics.

Brief Description of the Related Art

During welding and cutting of workpieces occur emissions, which are deposited in the environment of the processing site and thus can lead to a restriction of the function of a laser optics by deposits on the optical surfaces. These deposits not only limit the performance of the optical systems but can also damage or even destroy the laser optics. This means that the work process for repair must be interrupted, which is associated with cost losses in manufacturing.

The use of a protective glass in front of an optical system for its protection is known from the prior art and is probably the simplest but also the most common possibility to protect the very expensive optical systems from emissions. The use of a protective glass is known from published German patent application No. DE 100 60 176 A1 and is combined there with a sensor which detects soiling and damage to the protective glass so that it can be changed at an early stage. A disadvantage of this solution is that the change of the expensive protective glass significantly increases the operating costs of the system.

In published German patent application No. DE 43 29 322 A1 a device for increasing the service life of laser processing optics is disclosed, which has a protective glass arranged below a processing optics and an enclosure of the laser beam path. Furthermore, the device disclosed in this document comprises a cross-flow nozzle mounted halfway between the processing optics and a processing station. Again, this solution requires an expensive protective glass to be replaced.

The published International patent application No. WO 95/03911 A1 discloses a device in which an inflow opening is mounted above a cross-flow nozzle. Furthermore, published U.S. patent application No. U.S. Pat. No. 5,239,552 A discloses that the rinsing of a protective glass counteracts contamination. A disadvantage of this solution from the prior art is that each rinsing of the protective glass interrupts the production process and, if necessary, the expensive protective glass must be replaced.

In published German patent application No. DE 102 26 359 A1 a laser processing head is described, in which a cross-flow nozzle is arranged between housing and laser device. This serves to deflect flying splashes or welding fumes sideways in the direction of the laser optics. Again, in case of doubt, a soiled glass must be changed, which is associated with significant costs.

Published German patent application DE 100 47 057 A1 discloses a device in which an annular protective shield encloses the outlet opening of the laser beam. The disclosed protective shield has the shape of a spout and has only the necessary opening for the exit of the laser beam.

The protective cover is intended to keep splashes and other emissions away from the laser optics.

The published German patent application DE 101 23 097 A1 discloses a device for the protection of laser optics, wherein by means of a protective funnel from a nozzle gas is blown. On the side of a laser processing head of DE 101 23 097 A1 there is additionally a suction device in order to suck off deflected emissions from the molten bath.

Published German patent application No. DE 10 2005 0251 119 A1 discloses a device for increasing the service life of laser processing optics, which is used in particular for welding workpieces, with a protective glass arranged below the processing optics and an enclosure of the laser beam path, which is arranged on the lower edge of the processing optics and which encloses at least the space between the processing optics and a cross-flow nozzle, wherein the cross-flow nozzle is mounted halfway between the laser optics and the processing point, and wherein this housing immediately above the cross-flow nozzle has an inflow and a recess above and opposite the cross-flow nozzle and has directly below the protective glass of the laser optics a device for flushing the space enclosed by the housing with a gaseous medium.

In published Japanese patent application No. JP 2001 259872 A are between a condenser lens and the machining nozzle in a laser processing head, a first and a second protective glass in a distance from each other arranged. A gas is introduced into the space enclosed by the two protective glass plates, and a pressure sensor monitors the gas supply and generates a signal so that damages to the first protective glass can be detected. A disadvantage of the solution disclosed in this document is the use of the pressure sensor, leading to a more complex structure of the laser processing head.

Published German patent application No. DE 10 2014 210838 A1 discloses a coupling-in optical system for a laser welding head for machining a workpiece in a vacuum chamber, comprising a beam guiding tube with a workpiece-near end and a focusing lens arranged in the beam-guiding tube for focusing a laser beam onto a workpiece surface, wherein between the focusing lens and the workpiece near the end of the beam-guiding tube a protective glass is arranged, is characterized in that a component transparent to the laser beam is pressure-tightly mounted in the beam-guiding tube. In the disclosed device, the transparent component for the laser beam is surrounded by a gas at its sides, so that the device is limited to use in a vacuum chamber, otherwise fouling conditions can penetrate into the space between the protective glass and component.

In published Japanese patent application no. JP 2009 226474 A, a separate, dry gas is introduced into the interspace of two optical elements to avoid condensation. The design effort for the dry gas is disadvantageous to this disclosure.

Further, published Japanese patent application no. JP 2004 306106 A discloses an arrangement in which air is blown in at high speed between protective glasses in order to avoid contamination. On the embodiment shown in this document, the design complexity of the additional air circuit is disadvantageous.

SUMMARY OF THE INVENTION

The present invention is intended to solve the problem of avoiding an expensive and costly change of a high pressure resistant protective glass in a laser processing head with low design effort.

The present invention provides a device for the protection of laser optics, comprising a housing arranged below a laser optics with a connection for the supply of a cutting gas, an outlet nozzle for the cutting gas arranged on the opposite side to the laser optics side and a pressure-resistant protective first glass on the side of the laser optics and a process-side second protective glass on the side of the outlet nozzle, wherein the second protective glass is arranged between a first and second inlet nozzle for its two-sided impingement with cutting gas and the material of the second protective glass is thinner than the material of the first protective glass.

In a further aspect of the invention, the first and second protective glasses are arranged in a drawer for removal and insertion.

It is further contemplated that there is a cavity between the first and second protective glass.

The second glass may have a thickness of less than 2 mm.

It is further contemplated that the first glass is arranged gas-tight to the laser optics.

Furthermore, the device according to the invention may comprise in an embodiment, a control unit for regulating the pressure with which the second protective glass is impinged on both sides with cutting gas.

It is also envisaged that the second protective glass can be carried out as a valve for pressure equalization. It can be pushed by pressure of the cutting gas in the space of the housing above the cutting nozzle against seals in the drawer on the side of the high-pressure resistant protective glass.

The present invention further comprises a method of protecting laser optics comprising the steps of arranging a process-side second protective glass between a pressure-resistant first protective glass and an outlet nozzle for a cutting gas, and impingement of both sides of the process-side second protective glass by means of a first and second inlet nozzle with cutting gas.

The method may be configured in a manner to keep the pressure of the cutting gas between the first and second protective glass is equal to or greater than the pressure of the cutting gas between the second protective glass and the outlet nozzle of the cutting gas.

It is further provided that the pressure above and below the second glass is up to 25 bar maximum.

The method of the present invention may also include the step of placing at least the second protective glass in a drawer for removal and insertion.

Furthermore, the present invention relates to a method of using a second protective glass in laser optics for processing of workpieces, comprising the steps of arranging a process-side second protective glass between a pressure-resistant first protective glass and an outlet nozzle for a cutting gas, and impingement of both sides of the process-side second protective glass by means of a first and second inlet nozzle with cutting gas, and processing a workpiece.

Another embodiment of the pressure compensation may be the provision of an elastic seal of the process-side protective glass, wherein from a certain differential pressure between the upper and lower side of the protective glass, the protective glass lifts up from the seal to equalize the pressure and thus acts as a pressure equalization valve (see FIG. 2).

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

Figure 1:
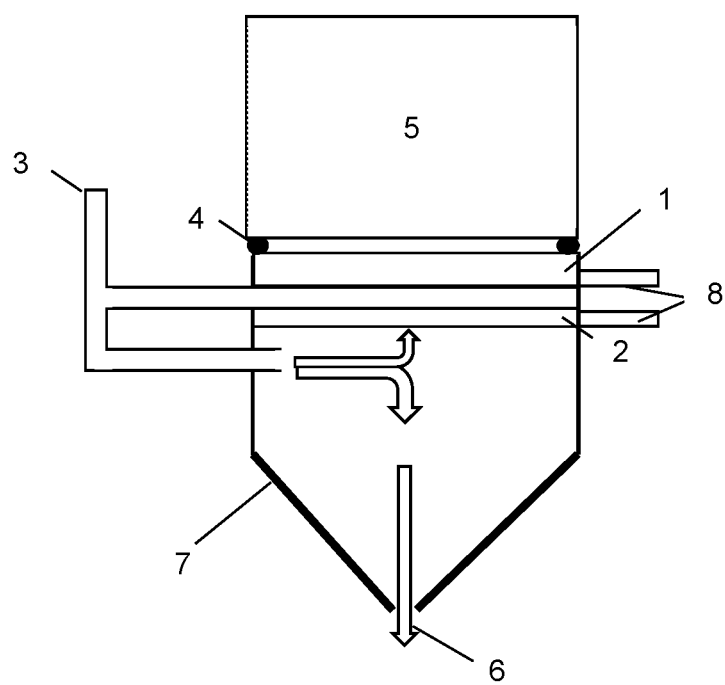
FIG. 1 shows a schematic representation of the arrangement of a process-side protective glass.

The present invention relates to an increase in service life of a laser processing optics. In laser processing heads for cutting workpieces, a protective glass is arranged close to the focusing lens or the process-related optical element, which is intended to keep metal splashes and contamination away from the process and the environment close to the optics. This protective glass is pressure-resistant and thus comparatively expensive. In addition, it must be changed frequently, which significantly increases the operating costs of such a device.

The present invention therefore proposes a further protective glass, which is arranged on the process side, i.e. the additional protective glass is arranged between the machining process and the pressure-resistant protective glass.

A thin, inexpensive glass can be used as additional protective glass, which can then be replaced instead of the more expensive, high pressure resistant protective glass. The additional protective glass, which is arranged on the process side, is impinged from both sides, i.e. in the direction of the pressure-resistant protective glass and in the direction of the processing process with an identical cutting gas pressure and the same gas. This allows for providing a very thin extra glass, although it is in contact with the cutting gas under pressure up to 25 bar, because it does not have to resist significant pressure differences. The arrangement is very simple, as no or a few additional elements need to be inserted.

A substantially constant pressure is formed in the space between additional glass and pressure-resistant protective glass. The high-pressure-resistant, more expensive protective glass continues to perform the function of securely sealing the optics against the cutting gas pressure, but this glass must be replaced less frequently during operation, as it is basically protected from contamination by the additional glass from the machining process.

The pressure on both sides of the additional protective glass should be substantially the same during operation. However, it can be somewhat higher in the space between the additional protective glass and the pressure-resistant protective glass than between additional glass and machining process, because during operation cutting gas exits through the cutting gas nozzle and thus the cutting gas pressure can drop slightly in this room.

The cutting gas may cause contamination of the upper pressure-resistant protective glass by introducing dirt during operation of the laser processing optics. Contamination of the pressure-resistant protective glass is further possible when the additional protective glass is not completely sealed towards the machining process. However, such a risk of contamination is unlikely because the space between the protective glasses is essentially filled once with cutting gas and then only a very low flow or replacement of the protective gas takes place. The tendency for higher pressure in the cavity between the protective glasses also makes it less likely that contaminants will be entrained on the pressure-resistant protective glass.

The protection of the more expensive, high-pressure resistant protective glass from contamination must be seen as a major advantage provided by the present invention. A change of the much cheaper, thinner additional protective glass is associated with lower costs, which significantly reduces the costs over time in a continuously operating system.

Another significant advantage provided by the present invention is that when changing the process-side protective glass, the optics no longer need to be opened as in known systems. If, in conventional systems, the optics-side protective glass is designed as a wear part, the optics are opened within the exchange time and contaminants can be introduced through the air into the sensitive optics. The optics may be damaged by such contaminations when the cutting or welding optics are put back into operation and require a repair. The proposed solution is thus more error-tolerant and robust in practical use.

FIG. 1 schematically shows a high-pressure-resistant protective glass 1, which is arranged by means of a seal 4 with a laser-sealing optical system 5 sealed pressure-tight. The high pressure resistant protective glass 1 is arranged in a drawer for removal and insertion in a housing 7.

An additional process-side protective glass 2 is arranged below the high pressure resistant protective glass. This is also located in a drawer for removal and insertion into the housing. 7.

Between the high-pressure-resistant protective glass 1 and the process-side protective glass 2 is a cavity filled with cutting gas, in which the cutting gas flows via the supply 3. The cutting gas not only fills the cavity between the protective glasses, but it also flows through feed 3 in housing 7, to finally reach nozzle 6, through which the cutting gas exits under pressure from housing 7 and is thus provided to the machining process. The second, process-side arranged protective glass can be impinged on both sides with cutting gas by the nozzles. For this purpose, the second outlet opening of feed 3 or a separate second nozzle for the cutting gas can be arranged in the space below the second protective glass in its direction (not shown). The application of the second protective glass from this second outlet opening of the feed 3 or a separate second nozzle is important for adjusting the pressure on both sides of the second protective glass, because the material of the second protective glass can hence be made thinner. A very simple and cost-effective protective glass can be used as the second protective glass, without thereby limiting process reliability or running times in the event of damage or contamination of the second glass. The use of the cutting gas and thus no additional gas or sensor for impinging both sides of the second protective glass is structurally significantly easier in comparison to the solutions known from the prior art.

For the purposes of the present invention, the cavity between the protective glasses is also referred to as above the process-side or additional protective glass. The space between additional or process-side protective glass and the nozzle 6 is also referred to as below the additional or process-side protective glass.

Figure 2:
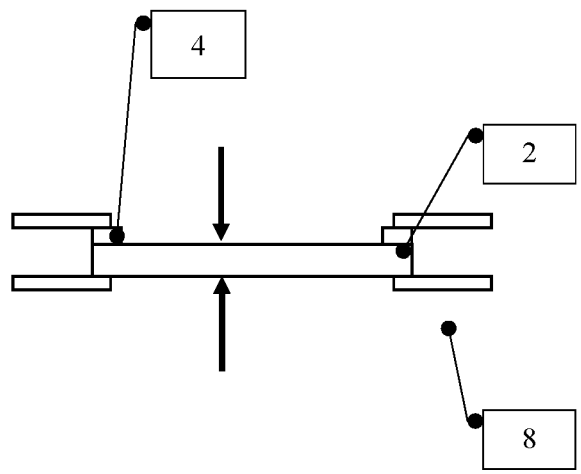
FIG. 2 shows a schematic representation of a process-side arranged protective glass with sealing in a drawer.

FIG. 2 shows again a protective glass 2 arranged on the process side with seals 4 for high-pressure-resistant protective glass in a drawer 8 for removal and insertion. The arrows indicate the pressure exerted on both sides of the protective glass arranged on the process side.

Figure 3:
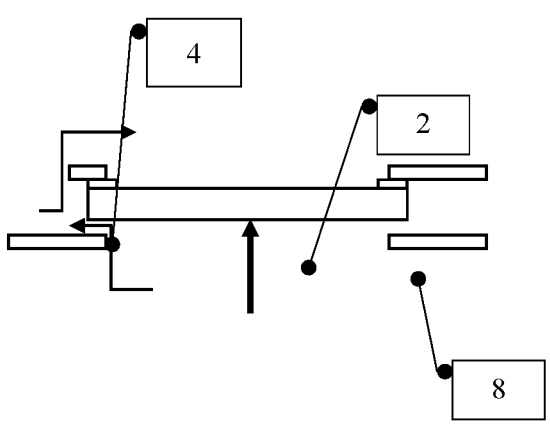
FIG. 3 shows a schematic representation of a process-side arranged protective glass as a valve with sealing in a drawer.

FIG. 3 shows a schematic view of a protective glass 2 arranged on the process side as a valve with a seal 4 in a drawer 8. If the pressure from the process side is high enough, the protective glass is pressed against the seal on the side for the high-pressure-resistant protective glass (not shown) and thus seals the cavity between the protective glasses.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 high pressure resistant protective glass
2 process-side protective glass
3 feed cutting gas
4 seal
5 optics
6 nozzle
7 housing
8 drawer

What is claimed is:

1. A method for protecting laser optics, comprising the steps of:
arranging a process-side second protective glass between a pressure-resistant first protective glass and an outlet nozzle for a cutting gas;
impinging both sides of the process-side second protective glass by communicating the cutting gas from first and second inlet nozzles;
impinging one side of the pressure-resistant first protective glass by communicating the cutting gas from the first nozzle;
communicating the cutting gas from the second inlet nozzle to the outlet nozzle; and
permitting higher pressure from the outlet nozzle to communicate with a cavity between the first and second protective glasses by opening the second protective glass as a one-way valve using an elastic seal.

2. The method of claim 1, comprising keeping the pressure of the cutting gas between the first and second protective glasses equal to or greater than the pressure of the cutting gas between the second protective glass and the outlet nozzle of the cutting gas.

3. The method of claim 1, wherein the pressure above and below the second protective glass is up to 25 bar maximum.

4. The method of claim 1, wherein at least the second protective glass is placed in a drawer for removal and insertion.

5. The method of claim 1, further comprising the steps of processing a workpiece using the laser and the cutting gas from the outlet nozzle.

6. The method of claim 1, comprising regulating pressure with which the second protective glass is impinged on both sides with the cutting gas.

7. The method of claim 1, comprising sealing an opposite side of the pressure-resistant first protective glass with the housing using a gas-tight seal.

8. A device having laser optics for a laser and using a cutting gas, the device comprising:
- a housing disposed on the device for passage of the laser from the laser optics;
- a first protective glass for passage of the laser, the first protective glass disposed in the housing and having first and second sides, the first side sealed toward the laser optics;
- a second protective glass for passage of the laser, the second protective glass disposed in the housing adjacent the second side of the first protective glass and defining a cavity therebetween;
- an outlet nozzle for passage of the laser and the cutting gas, the outlet nozzle disposed on the housing adjacent the second protective glass;
- a first nozzle disposed in communication with the cavity between the first and second protective glasses, the first nozzle impinging the cutting gas on the second side of the first protective glass and impinging the cutting gas on one side of the second protective glass;
- a second nozzle in communication with the outlet nozzle, the second nozzle impinging the cutting gas on an opposite side of the second protective glass and communicating the cutting gas to the outlet nozzle; and
- an elastic seal disposed between the one side of the second protective glass and the housing, the second protective glass and the seal being configured as a one-way valve permitting higher pressure from the opposite side of the second protective glass to communicate with the cavity between the first and second protective glasses.

9. The device of claim 8, wherein the first protective glass is arranged gas-tight to the laser optics.

10. The device of claim 8, comprising a control unit for regulating the pressure with which the second protective glass is impinged on both sides with the cutting gas.

11. The device of claim 8, wherein the second protective glass and the seal being configured as the one-way valve are configured for pressure equalization.

12. The device of claim 8, wherein the housing comprises a drawer holding the first and second protective glasses and arranged for removal and insertion in the housing.

13. The device of claim 8, wherein the second protective glass is thinner than the first protective glass.

14. The device of claim 13, wherein the second protective glass has a thickness of less than 2 mm.

15. The device of claim 8, comprising a gas-tight seal disposed between the first side of the first protective glass and the housing.

16. The device of claim 8, comprising a control unit being configured to regulate delivery of the cutting gas to the first and second nozzles.

17. The device of claim 16, wherein the control unit is configured to keep the pressure of the cutting gas between the first and second protective glasses equal to or greater than the pressure of the cutting gas between the second protective glass and the outlet nozzle.

18. The device of claim 17, wherein the pressure above and below the second protective glass is up to 25 bar maximum.

19. The device of claim 16, wherein the control unit is configured to regulate the pressure with which the second protective glass is impinged on both sides with the cutting gas.

* * * * *